(12) United States Patent
Howard et al.

(10) Patent No.: US 9,445,689 B1
(45) Date of Patent: Sep. 20, 2016

(54) TRANSFER MECHANISM FOR A CONTINUOUS HEAT TRANSFER SYSTEM

(71) Applicant: Unitherm Food Systems, Inc., Bristow, OK (US)

(72) Inventors: David Howard, Bristow, OK (US); Austen Laur, Tulsa, OK (US)

(73) Assignee: Unitherm Food Systems, Inc., Bristow, OK (US)

( * ) Notice: Subject to any disclaimer, the term of this patent is extended or adjusted under 35 U.S.C. 154(b) by 0 days.

(21) Appl. No.: 14/733,377

(22) Filed: Jun. 8, 2015

(51) Int. Cl.
  *A47J 37/04* (2006.01)
  *B65G 47/76* (2006.01)
  *B65G 47/66* (2006.01)

(52) U.S. Cl.
  CPC .............. *A47J 37/049* (2013.01); *B65G 47/66* (2013.01); *B65G 47/766* (2013.01)

(58) Field of Classification Search
  CPC .... B65G 45/16; B65G 47/66; B65G 47/769; B65G 47/766; A21B 1/48; A47J 37/045; A47J 37/049
  USPC ........................ 198/499, 600; 99/386, 443 C
  See application file for complete search history.

(56) References Cited

U.S. PATENT DOCUMENTS

| | | | | |
|---|---|---|---|---|
| 3,815,727 A * | 6/1974 | Hartwig | ............... | B65G 47/766 198/637 |
| 3,853,212 A * | 12/1974 | Downes | ................ | B65G 43/02 198/572 |
| 5,592,870 A * | 1/1997 | Sanchez | .................... | A21C 5/00 99/353 |
| 5,597,062 A * | 1/1997 | Biwer | ..................... | B65G 47/66 198/600 |
| 7,506,750 B2 * | 3/2009 | Costanzo | ............... | B65G 17/24 198/600 |
| 7,648,020 B2 * | 1/2010 | Dickover | ............... | B65G 43/00 186/68 |
| 2006/0163039 A1 * | 7/2006 | Marshall | ................ | B65G 15/54 198/778 |

* cited by examiner

*Primary Examiner* — Leslie A Nicholson, III
*Assistant Examiner* — Keith R Campbell
(74) *Attorney, Agent, or Firm* — GableGotwals

(57) ABSTRACT

A transfer mechanism for use in a continuous cooking system includes a non-metallic counter-balance having a contact bar located toward its uppermost end and a load located toward its lowermost end. The contact bar is sized to span a useable width of the belt and the load is sized to urge the contact bar into continued contact with a portion of the belt as the belt travels around the end roller. A rotational joint is provided for pivoting the counter-balance toward and away from belt, the joint being arranged to provide a predetermined amount of travel relative to the belt. A slot is provided for adjusting a position of the counter-balance relative to the belt. The uppermost product-contact surface of the bar can be round, flat, or angled and can include grooves to reduce the amount of contact area.

19 Claims, 7 Drawing Sheets

TRANSFER MECHANISM FOR A CONTINUOUS HEAT TRANSFER SYSTEM

BACKGROUND OF THE INVENTION

This invention relates generally to continuous heat transfer systems of the kind used in commercial settings to produce pre-cooked food products. More particularly, the invention relates to transfer mechanisms and devices used to transfer food product into and out of these continuous heat transfer systems such as fryers, water cookers, steamers, microwave, infrared systems, and linear and spiral ovens.

The development of continuous ovens in the food industry has grown significantly over the past 20 years, along with the increased demand for pre-cooked food products and the range of those products. Products ranging from roasted vegetables to teriyaki chicken and other marinated chicken products are now cooked on continuous ovens and an increasing number of food products are cooked in continuous fryers, water cookers, steamers, microwave, and infrared systems. Practically every heat transfer system now known to man is utilized on food products.

A constant challenge for the manufacturers of this equipment is the transfers into and out of the continuous heat transfer system. By way of example, consider the transfer of a partially cooked sausage patty being transferred off the end of a spiral oven cook belt in a first (par-cook) zone and transferred in-line to a second spiral oven to be fully cooked. Those skilled in the art would recognize that the transfer mechanism used in a spiral oven application can apply to any continuous heat transfer system or process.

The patties are nominally 3/16" thick and 3¾" in diameter, weighing 1.3 oz. When in batter form, the sausage must be formed into patties at a temperature of 25° F. to 28° F. Forming the patties below the freezing point greatly aids in the transfer of the product into the spiral oven. Above this temperature, the batter is more fluid and will not form with a consistent shape. Like any meat product, the more each patty is cooked, the more the protein sets up and the more rigid the product becomes. Therefore, fully cooking the patties helps the product transfer more easily but, like par-cooked product, fully cooked product can also adhere to the belt.

Some spiral oven manufacturers, such as GEA and Marel, seek to overcome this problem by having one belt that passes through two spirals, effectively eliminating the transfer between the first and second zones. However, this solution restricts the residence time in each zone to a fixed formula. For example, if Zone 1 has 100 meters of belt and Zone 2 has 100 meters of belt, the residence time in each zone must be equal. Similarly, if the belt ratio in each zone is different, for example 70 to 30, then the overall time is fixed to a 70/30 split.

Residence time in each zone can independently vary by using a transfer system like one provided by Unitherm Food Systems, Inc. ("Unitherm") which allows each zone to have a separate belt. The Unitherm system uses a driven roller located at the end of the heat transfer equipment, with a small gap between the belt and the roller. The gap eliminates metal-to-metal contact that can create metal shavings or oxidation that develops a black oil-like substance that emulsifies between the metal surfaces. The reliability of this transfer system is critical because if it fails on any part of the belt, product can be ruined during the transfer (or failed transfer) and not recovered.

Other Unitherm transfer systems include a close, tight-turn radius shafts with belts. Again, there is a small gap between the belt and the shafts. Occasionally a fixed scraper is used that is in contact with the belt. This type of transfer, while effective, can wear out quickly and can occasionally jam against the belt.

Because spiral oven belts expand and contract—collapsing on the inside and, in some configurations, expanding on the outside—the belts can form temporary bumps, or peaks and valleys, when the links do not rest as intended or as the belt links travel around the curvature of a shaft. The rate of expansion and contraction at the discharge roller can also vary.

The belts are typically of the kind made by Ashworth Brothers and Cambridge Belt Co. (see FIG. 1 for a typical oven belt pattern). As the belt turns around the end of the roller/sprocket at the discharge or exit end of the belt, the belt takes a polygonal shape due to the presence of rigid links, that is, turning in a manner similar to rotating a hexagon. Therefore, the radius is not smooth. Additionally, the temperature at this end can be in the range of 200° F. to 450° F., depending on the operating temperature of the oven. In processes that make use of flame grills, the temperature at the exit end of the belt can be as high as 800° F.

There is a need for a transfer system that can reliably transfer par-cooked meat product and transfer product off the hot, non-smooth radius, end-portion of the belt that is in a variable state of collapse and, potentially, with a temporary bump, peak, or valley in the belt.

SUMMARY OF THE INVENTION

A transfer mechanism made according to this invention includes a non-metallic counter-balance which has a contact bar located toward its uppermost end and a load located toward its lowermost end. The contact bar is preferably sized to span a useable width of the belt and the load, which can be a physical counterweight, is sized to urge the contact bar into continued contact with a portion of the belt as the belt travels around the end roller. Means for pivoting the counter-balance toward and away from belt, such as a rotational joint, provide a predetermined amount of travel relative to belt. Means for adjusting a position of the counter-balance relative to the belt, such as an arcuate slot, are also provided.

Preferably, the counter-balance is a thermoplastic capable of withstanding a temperature of at least 200° F. The uppermost product-contact surface of the contact bar can be cylindrical-shaped, flat or angled, and may include a plurality of grooves arranged perpendicular to a longitudinal axis of the contact bar. The bar can also be tapered along its length.

Objectives of the invention include but are not limited to providing a transfer mechanism that (1) does not wear out quickly and or occasionally jam against the belt; (2) eliminates or reduces the chance of product adhering to the transfer mechanism during product transfer; (3) can reliably transfer product off the hot, non-smooth radius, end-portion of the belt that is in a variable state of collapse and, potentially, with a temporary bump, peak, or valley in the belt; (4) can remain in constant (no-gap) contact with the belt and (5) can be retrofitted for use in existing continuous cooking systems.

ELEMENTS AND NUMBERING USED IN THE DRAWINGS

Figure 1:
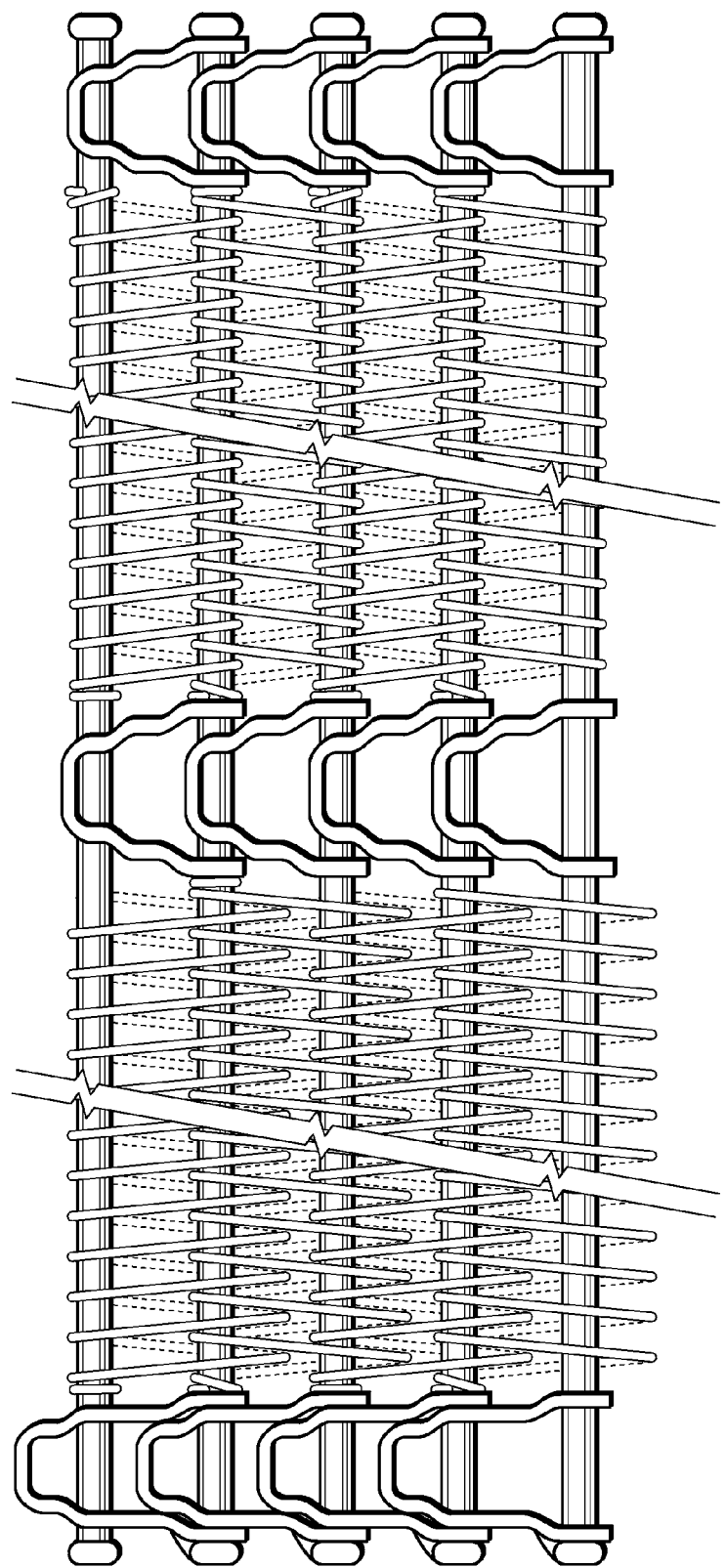
FIG. 1 is a prior art cook belt.
Figure 2:
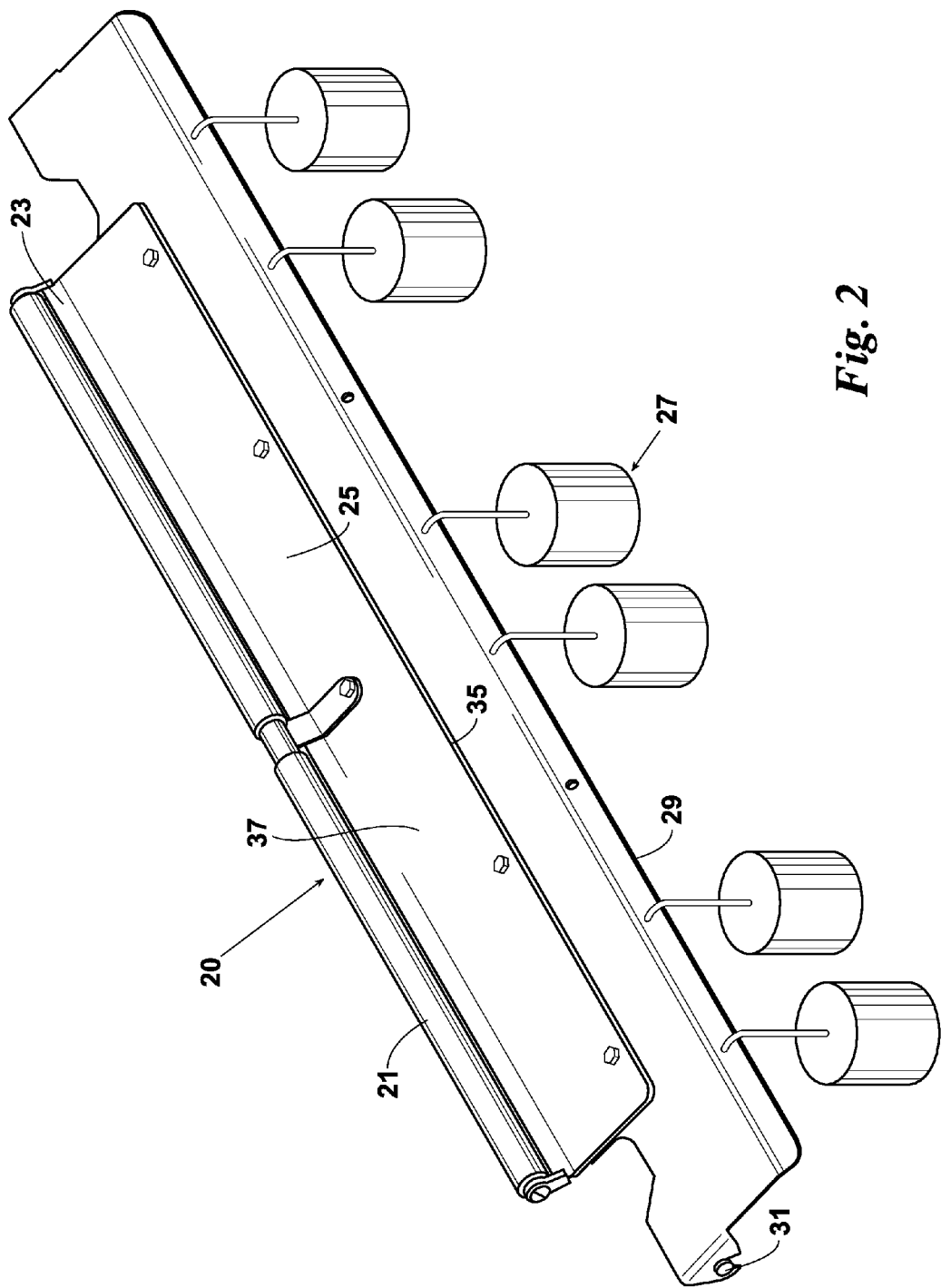
FIG. 2 is an isometric view of a preferred embodiment of a transfer mechanism made according to this invention.
Figure 3:
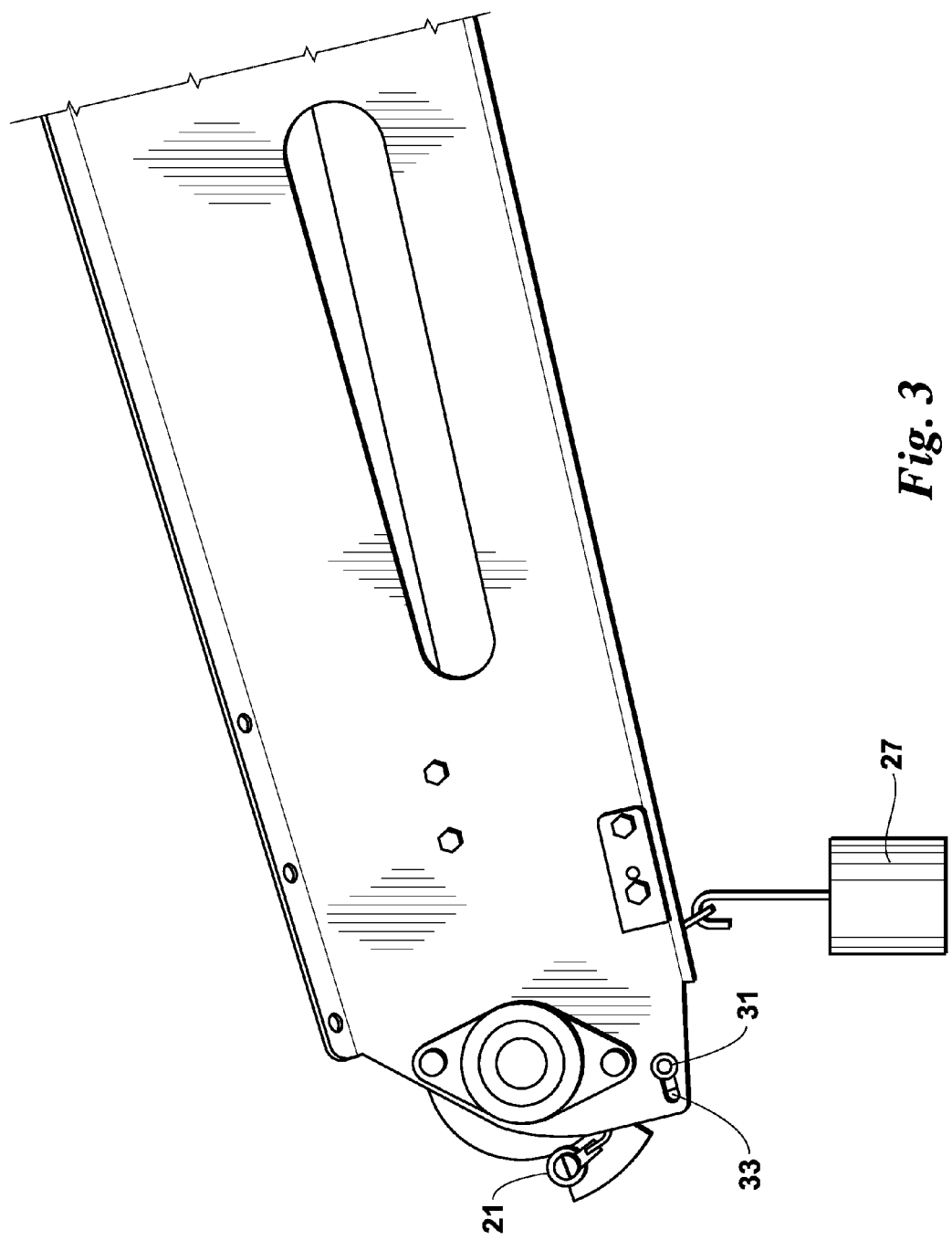
FIG. 3 is a side view of the transfer mechanism of FIG. 2 when installed at the end of an upstream continuous heat transfer process such as a spiral oven and arranged to transfer partially cooked or fully cooked product to a belt of an immediate downstream process.
Figure 4:
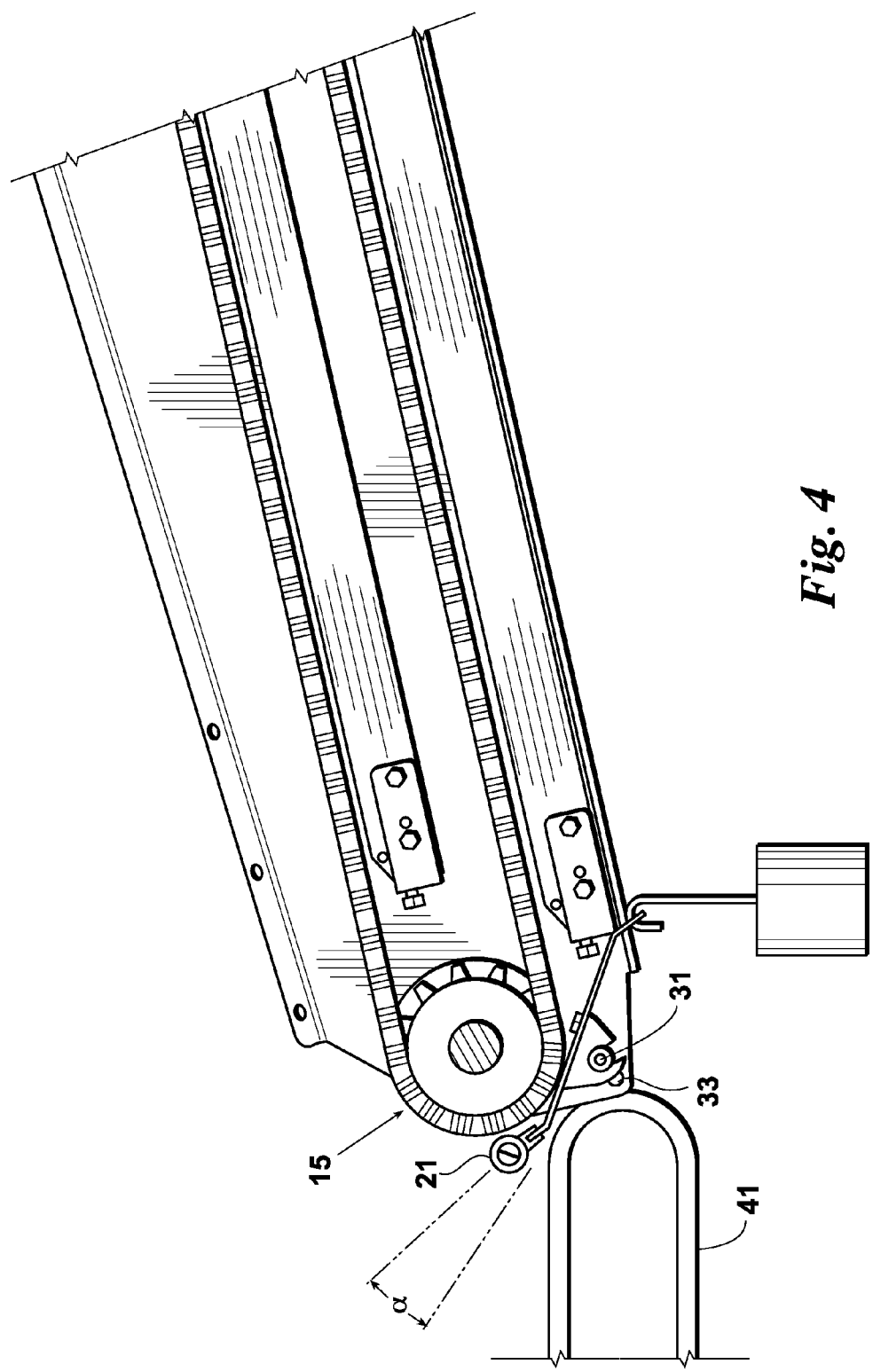
FIG. 4 is a side view of the transfer mechanism of FIG. 2 illustrating how its position and angle can be changed relative to the belt.
Figure 5:
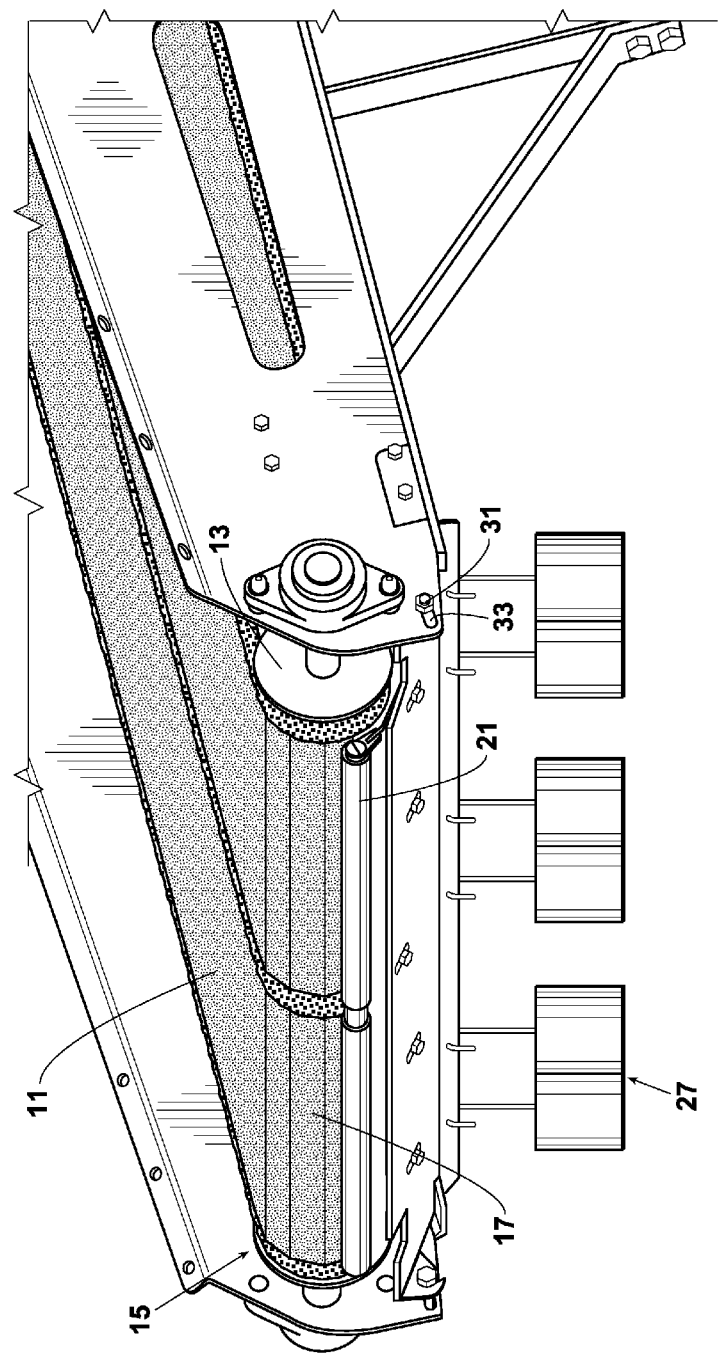
FIG. 5 is an isometric view of the transfer mechanism of FIG. 2 when installed at the end of a continuous heat transfer process.

11 Sprocket-driven belt ("first belt")
13 Sprocket and roller
15 End of continuous heat transfer system (e.g. spiral oven)
17 Curved or polygonal portion of 11
20 Counterbalance
21 Contact bar or roller
22 Grooves
23 Upper end
25 Arm or plate
26 Top (uppermost) product-contact surface
27 Load
28 Taper or tapered profile
29 Lower end
31 Pivot arm or shaft (pivot point or rotational joint)
33 Adjustment slot
35 Scraper
37 Upper surface
41 Belt ("second belt")

DETAILED DESCRIPTION OF THE PREFERRED EMBODIMENTS

A preferred embodiment of a transfer mechanism made according to this invention includes an inverted counter-balance 20 that is designed to, and can follow, the polygonal pattern of the cook belt 11 as the cook belt 11 travels the around the sprocket and roller 13 (see FIGS. 2-5). Cook belt 11 is of a kind well known in the art and can be a mesh- or link-style belt used in any of a number of continuous heat transfer systems commonly used to produce pre-cooked food products (see e.g. FIG. 1).

The sprocket and roller 13 is located at the end 15 of a continuous heat transfer system or process such as a fryer, water cooker, steamer, microwave, infrared system, or linear or spiral oven (not shown). Counter-balance 20 assists in the transfer of the product cooked or par-cooked by the heat transfer system to a belt 41 of the next immediate downstream process. Typically, belt 41 is arranged at a lower elevation than belt 11.

Preferably, the angle and position of the counter-balance 20 is adjustable, as is the load 27 applied on the counter-balance 20. The load 27, which can be determined through calculation and routine experimentation, is selected for the specific belt 11, conveyor placement/angle, speed, and product type of the pre-cooked food product application. Adjusting means such as an adjustment slot 33 or its equivalent allows for the proper conveyor placement/angle of the counter-balance 20 (see FIG. 4).

Figure 6:
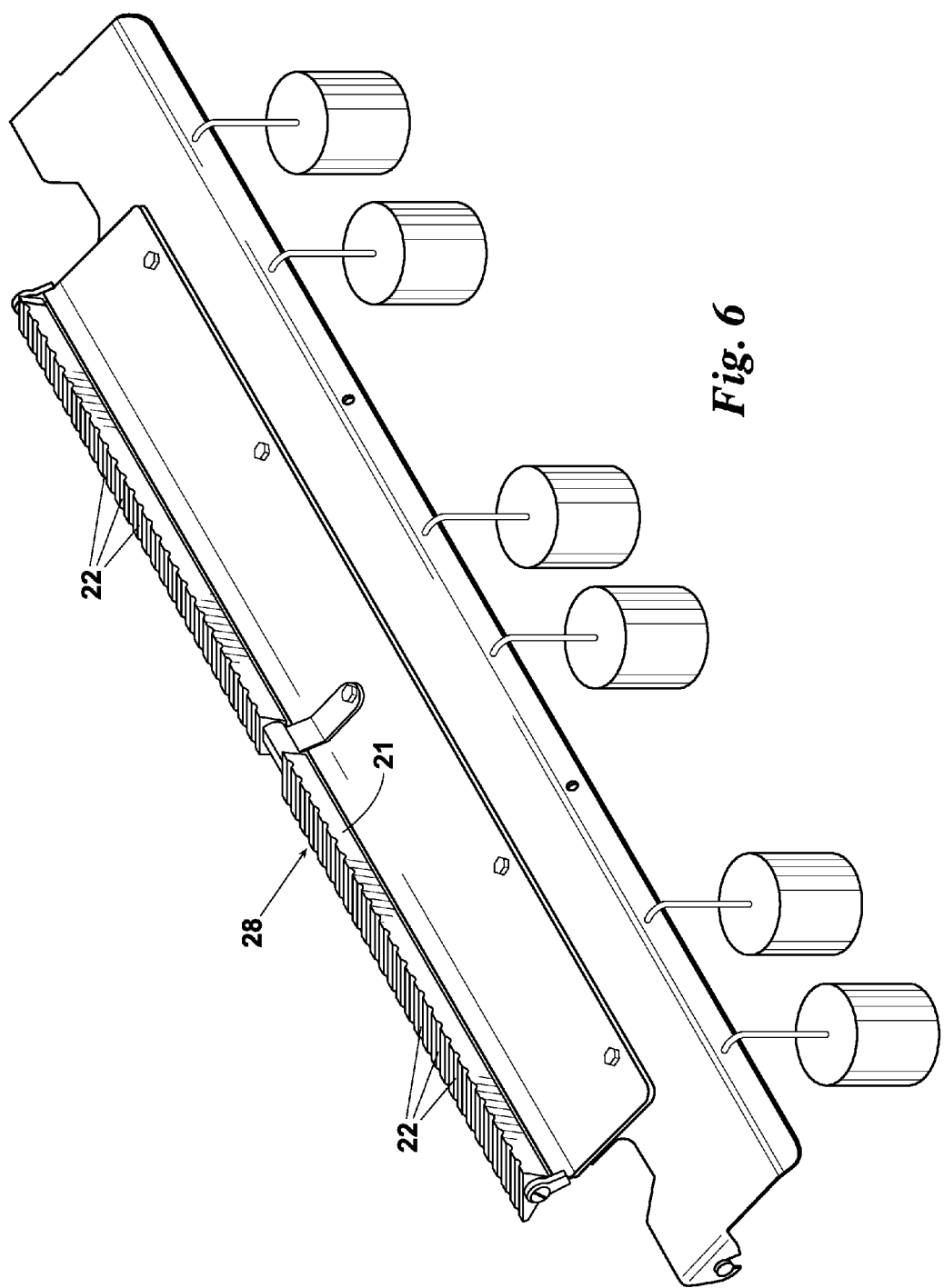
FIG. 6 is an isometric view of an alternate preferred embodiment of the transfer mechanism's contact bar. The bar has a triangular profile and includes grooves along the direction of travel to reduce contact surface area. Additionally, the bar has a tapered profile along the width of the belt to create a varied length of the top product-contact surface to accommodate belts which have non-uniform characteristics across their width.
Figure 7:
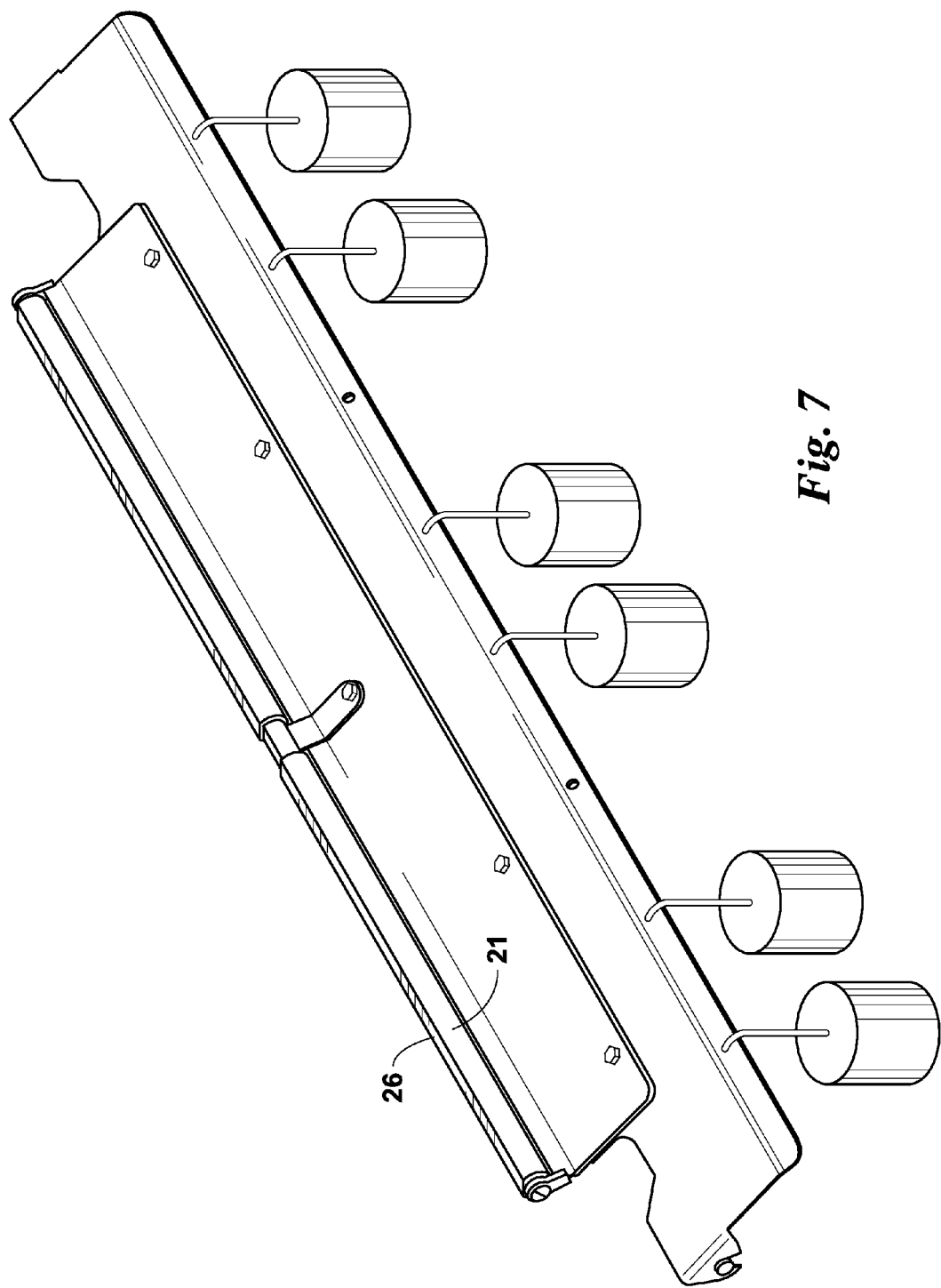
FIG. 7 is an isometric view of an another alternate embodiment of the contact bar. The bar provides a smooth, rounded contact surface to the belt, but has a flat (angled) top surface to assist in the scraping/peeling of product from the belt rather than allow thin patties to 'nose-dive' into a rounded top surface.

The counter-balance 20 includes a contact bar or roller 21 located at the upper end 23 of the counter-balance arm or plate 25 and a load 27 located toward the lower end 29. Contact bar 21 is not limited to a round or cylindrical shape (see FIG. 2) but can be any shape preferable and appropriate for the specific application, such as a triangular profile or containing variation across the belt width. For example, in one preferred embodiment the bar 21 has a triangular profile and includes grooves 22 along the direction of travel (perpendicular to a longitudinal axis of the bar 21) to reduce contact surface area (see FIG. 6). Additionally, the bar 21 has a tapered profile 28 along the width of the belt 11 to create a varied length of the top product-contact surface to accommodate belts 11 which have non-uniform characteristics across their width. In another alternate embodiment of the contact bar 21, bar 21 includes a smooth, rounded contact surface to the belt 11, but has a flat (angled) top product-contact surface 26 to assist in the scraping/peeling of product from the belt 11 rather than allow thin patties to 'nose-dive' into a rounded top surface. (see FIG. 7).

The load 27, in combination with pivoting means such as a pivot arm or shaft 31, allows the bar 21 to be in constant contact with a curved or polygonal portion 17 of the belt 11 along a usable width "W" of the belt 11 but does not inhibit the speed at which the belt 11 moves around (or about) the roller 13. If there is an isolated high spot on belt 11, the high spot will generally be in a flexible (unsupported region) where the applied force (if great enough) will press or flatten the high spot in the flexible portion. Generally, high spots are more specific to the linear direction of belt travel, either through the previously mentioned rotation of a polygon or through a wire mesh overlay that has the potential to create a high spot as the belt travels around the shaft.

Pivoting means other than shaft 31 can be used to provide a rotating joint. For example, a pin or bolt and bushing combination or a bearing can be used.

The material used for counter-balance 20 is preferably one that is non-metallic, low friction, food-grade (FDA-compliant) material that can withstand, at a minimum, 200° F. and, more preferably, at least 450° F. In other embodiments, the material can withstand temperatures up to 800° F. A suitable material is an engineering thermoplastic such as polyetheretherketone ("PEEK") or its equivalent, which is typically rated up to 500° F. RULON® 641 PTFE-based resin (Saint-Gobain Performance Plastics Corp., Aurora, Ohio) is another high temperature food-grade plastic that is rated up to 550° F. Other suitable materials can include a food-grade ceramic or its equivalent. Unlike prior art transfer mechanisms, no gap is required between the contact bar 21 and the belt 11 because counter-balance 20 is non-metallic.

When the belt 11 forms a temporary bump or peak, the counter-balance 20 pivots away but maintains contact with the belt 11. After the bump or peak passes, the counter-balance 20 pivots toward the belt 11, again maintaining constant contact with the belt 11. The counter-balance 20 provides for travel through a predetermined angle α, and is preferable an angle that prevents the bar 21 or other portions of the transfer mechanism from coming into contact with the belt 41 of the downstream process.

A scraper 35 is located on the upper surface 37 of the counter-balance 20. The balance 20 also allows the scraper 35 to maintain contact with the belt 11 but move out of the way when a temporary flaw in the belt 11 is encountered. The scraper 35 may have any kind of edge preferable and appropriate to the application. For example, a scraper 35 having a sharper edge than the one shown here can be used (yet still be capable of moving out of the way when required).

Load 27 is illustrated as plurality of physical counterweights. However, applying a load to the belt surface can be done with different methods such as but not limited to springs and pneumatics. Regardless of the method used, what is important is that a sufficient load be applied to the counter-balance 20 so that it maintains contact with the belt 11 as it moves around roller 13 but can move or pivot away—again, maintaining contact with the belt 11—when a flaw is encountered. By way of a non-limiting example, counterweights of between 24 and 48 lbm were applied, which translated to approximately 12 to 25 lbf of contact force from the scraper on the belt. This, in turn, corresponded to between 0.3 and 0.7 lbf applied per inch of belt width. The force necessary in any specific application is dependent on a number of variables, including but not limited to belt type, operating conditions, speed, and scraper/belt configuration.

What is claimed is:

1. A transfer mechanism for use in a continuous cooking system which has a first continuous belt that travels around a roller located at an end of the continuous cooking system, the transfer mechanism comprising:
   a non-metallic counter-balance having a contact bar located toward its uppermost end and a load located toward its lowermost end, the contact bar sized to span a useable width of the belt, the load sized to urge the contact bar into continued contact with a portion of the first continuous belt as the first continuous belt travels around the roller;
   means for pivoting the counter-balance toward and away from the portion of the first continuous belt, the pivoting means arranged to provide a predetermined amount of travel relative to the first continuous belt; and
   means for adjusting a position of the counter-balance relative to the first continuous belt.

2. A transfer mechanism according to claim 1 wherein the load is at least one physical counterweight.

3. A transfer mechanism according to claim 1 wherein the means for pivoting the counter-balance is a rotational joint.

4. A transfer mechanism according to claim 1 wherein the means for adjusting the position of the counter-balance is an adjustment slot that receives a rotational joint connected to the counter-balance.

5. A transfer mechanism according to claim 1 further comprising a scraper located on a upper surface of the counter-balance.

6. A transfer mechanism according to claim 1 wherein the counter-balance is a thermoplastic capable of withstanding a temperature of at least 200° F.

7. A transfer mechanism according to claim 6 wherein the counter-balance is a thermoplastic capable of withstanding a temperature up to 450° F.

8. A transfer mechanism according to claim 6 wherein the thermoplastic is polyetheretherketone.

9. A transfer mechanism according to claim 1 wherein the load is at least one physical counterweight.

10. A transfer mechanism for use in a continuous cooking system which has a first continuous belt that travels around a roller located at an end of the continuous cooking system, the transfer mechanism comprising:
    a non-metallic counter-balance having a contact bar located toward its uppermost end and a load located toward its lowermost end, the load sized to urge the contact bar into continued contact with a portion of the first continuous belt as the first continuous belt travels around the roller; the contact bar having an uppermost product-contact surface with a temperature rating of at least 200° F.; and
    means for adjusting a position of the counter-balance relative to the first continuous belt.

11. A transfer mechanism according to claim 10 wherein the uppermost product-contact surface is cylindrical-shaped.

12. A transfer mechanism according to claim 10 wherein the uppermost product-contact surface is angled.

13. A transfer mechanism according to claim 10 wherein the uppermost product-contact surface includes a plurality of grooves arranged perpendicular to a longitudinal axis of the contact bar.

14. A transfer mechanism according to claim 10 wherein the uppermost product-contact surface is tapered along a length of the contact bar.

15. A transfer mechanism according to claim 10 further comprising means for pivoting the counter-balance toward and away from a portion of the first continuous belt, the pivoting means arranged to provide a predetermined amount of travel relative to the first continuous belt.

16. A transfer mechanism according to claim 10 wherein the means for adjusting the position of the counter-balance is an adjustment slot that receives a rotational joint connected to the counter-balance.

17. A transfer mechanism for use in a continuous cooking system which has a first continuous belt that travels around a roller located at an end of the continuous cooking system comprising:
    a counter-balance having a contact bar located toward its uppermost end and a load sized to urge the contact bar into continued contact with a portion of a first continuous belt as the first continuous belt travels around the roller; and
    means for adjusting a position of the counter-balance relative to the first continuous belt.

18. A transfer mechanism according to claim 17 wherein the means for adjusting the position of the counter-balance includes an adjustment slot.

19. A transfer mechanism according to claim 18 further comprising a rotational joint connected to the counter-balance, the adjustment slot sized to receive the rotational joint.

* * * * *